United States Patent Office 2,899,713
Patented Aug. 18, 1959

2,899,713
ORIENTATION OF POLYETHYLENE TEREPHTHALATE FILM

Christian Bent Lundsager, Buffalo, N.Y., assignor to E. I. du Pont de Nemours and Company, Wilmington, Del., a corporation of Delaware No Drawing. Application June 5, 1958
Serial No. 739,978

5 Claims. (Cl. 18—56)

This invention relates to the treatment of polyethylene terephthalate film and, more particularly, to a process for orienting film of crystalline polyethylene terephthalate.

This application is a continuation-in-part of my co-pending application Serial No. 567,755, filed February 27, 1956.

An object of this invention is to provide an improved process for orienting crystalline polyethylene terephthalate film. Another object is to provide a simple and highly efficient process for orienting crystalline polyethylene terephthalate film. Still another object is to provide an efficient process for biaxially-orienting crystalline polyethylene terephthalate film whereby to produce a balanced film. The foregoing and other objects will more clearly appear hereinafter.

These objects are realized by the present invention which, briefly stated, comprises rolling out unoriented, crystalline polyethylene terephthalate film having a density of at least 1.36 to the desired thickness with heated pressure rolls while maintaining the rolls at a temperature within the range of 150° C.–190° C., whereby to effect orientation of the film. Unexpectedly, the aforementioned process not only serves to orient the film but also imparts heat-stability to the oriented film.

Unoriented polyethylene terephthalate film to be treated in accordance with the process of this invention must be crystalline to the extent that its density is at least 1.36 (grams/cc.), as compared with a density of 1.331 for amorphous unoriented polyethylene terephthalate film at 30° C. X-ray studies give a density calculated from the dimensions of the triclinic unit cell as 1.47 for the theoretically pure crystalline polymer. Therefore, polyethylene terephthalate films having a density between 1.331 and 1.47 exhibit varying degrees of crystallinity. Films having a density of at least 1.36 or higher may be readily rolled at temperatures within the range from 150° C.–190° C., without running the risk of having the film stick to the rolls. By increasing the temperature of the film in steps, the crystallinity of the film will be constantly increasing by virtue of its being maintained at progressively more elevated temperature, and the second direction rolling may be then carried out at a temperature at least as high as the temperature of the last roll through which the film passed in the first direction, or higher.

Attempts to roll crystalline polyethylene terephthalate film having a density of at least 1.36 at temperatures below 100° C. have resulted in shattering the film because of its inherent brittleness. On the other hand, rolling the film at temperatures in excess of about 190° C. will generally result in excessive sticking between the film surfaces and the rolls. However, rolling in the range of 100° C.–150° C. produces films having relatively low thermal stability. Hence, the preferred temperature range for rolling unoriented, crystalline polyethylene terephthalate film is relatively narrow, that is, between 150°–190° C.

To form relatively heat-stable, oriented polyethylene terephthalate films, it is preferred to carry out rolling of crystalline polyethylene terephthalate films having a density of at least 1.36, at a temperature of at least 150° C., and closer to 190° C., to a thickness reduction ratio of at least 0.50 in both directions, the thickness reduction ratio being substantially the same in both directions. The term "thickness reduction ratio" may be defined by the following expression:

$$\text{Thickness reduction ratio} = \frac{t_1 - t_2}{t_1}$$

wherein $t_1$ = original film thickness
$t_2$ = film thickness after rolling in one direction By rolling a crystalline polyethylene terephthalate film in both directions at a temperature between 150°–190° C., the resulting oriented film is substantially heat-set, which means that it will shrink only a few percent of its new dimensions when subjected to temperatures in slight excess of the actual temperature of rolling. In general, rolling at temperatures within the range from 150° C.–190° C. promotes appreciable further crystallization of the initial crystalline film, and this aids in "locking-in" the orientation imparted to the film by rolling. It is preferred to roll at such elevated temperatures so that crystallization will tend to "lock-in" orientation imparted to the film in the first rolling direction so that rolling in the second direction will not destroy the orientation effected during rolling in the first direction.

The temperatures stated above and hereinafter, unless otherwise specified, refer to the surface temperature of the rolls. The film temperature in the nip of the rolls is probably higher. Factors which affect the temperature of the film during rolling, besides the actual surface temperature of the rolls, include the thickness reduction ratio, the speed of the rolls, the initial film thickness, and the roll diameters.

The degree to which the thickness of the film should be reduced by rolling in each direction is a matter of choice. Usually, however, to obtain an optimum degree of orientation, the thickness reduction ratio for each direction of rolling should be at least 0.50. Rolling an initially crystalline film to the extent that the thickness reduction ratio is substantially the same in both direction of rolling will produce a film having substantially balanced tensile properties. By the term "balanced" is meant that such properties as tensile strength and initial tensile modulus are substantially the same as measured in both directions of rolling. If a particular end use requires substantial balance of other physical properties, such as tear strength and elongation, this can be done by adjusting the thickness reduction ratios to provide for such balance with as little sacrifice as possible in the balance of tensile properties. Another factor which affects the degree to which the thickness of the initial crystalline film will be reduced by rolling in both directions is the initial thickness of the film. In some cases, particularly for glazing applications, it is desirable to obtain a relatively thick oriented film. Therefore, it is necessary that the thickness reduction in both directions of rolling be just enough to obtain the desired level of physical properties and yet obtain the desired film thickness.

The following specific examples further ilustrate the principles and practice of my invention.

In each of Examples 1–3 and control B, crystalline (crystallized at 130° C. for 5 minutes) polyethylene terephthalate film having a density of 1.36 grams/cc. was rolled (the film before rolling was at room temperature) in one direction (MD) by passing the film through the nip of two stainless steel rolls 4.625" in diameter, 8" in length, and rotating at a speed of about 2 r.p.m. The film was then rolled in a second direction (TD) by turning it at right angles to the first direction of rolling, and again passing it through the same set of rolls to reduce further the thickness of the film.

The following table, Table I, summarizes pertinent information for each example, such as original film thickness, thickness of the film after two-way rolling, temperature of rolls, thickness reduction ratio after first rolling and after second rolling. Furthermore, the table includes the tenacity, percent elongation, initial tensile modulus and thermal shrinkage of the resulting rolled film.

The tenacity or tensile strength of the rolled film structures is based upon the initial cross-sectional area of the rolled film. Tensile strength, as recorded in the following table, is determined by elongating the film at the rate of 100% per minute or less until the sample breaks.

The percent elongation is the elongation of the film at the breaking point. Elongation is measured simultaneously with tenacity at the breaking point. The sample is elongated at 100% per minute.

Thermal shrinkage is determined by measuring the amount of shrinkage after allowing free shrinkage of a sheet of film in an oven at 150° C. for ½ hour. The percent shrinkage is calculated by measuring the dimension difference before and after shrinkage and dividing this by the dimension before shrinkage and multiplying by 100.

In Examples 4–5 and controls A and B, crystalline (crystallized at 130° C. for 5 minutes under a pressure of about 1200 p.s.i. and cooled to 80° C. before releasing pressure) polyethylene terephthalate film having a density of about 1.3705 grams/cc. was rolled (the film before rolling was at room temperature) in one direction (MD) by passing the film through the nip of two stainless steel rolls 4¾" in diameter and about 8" in length and rotating at a speed of about 2 r.p.m. The film was then rolled in a second direction (TD) by turning it at right angles to the first direction of rolling, and again passing it through the same set of rolls to reduce further the thickness of the film.

Table II summarizes pertinent information for each example such as original film thickness, thickness of film after two-way rolling process, temperature of rolls, and

TABLE II

*Properties of two-way rolled crystalline polyethylene terephthalate film and conditions of rolling*

| Rolling Conditions and Film Properties | Example 4 | Example 5 | Control A | Control B |
|---|---|---|---|---|
| Temperature of Rolls, ° C. | 160 | 160 | 135 | 112 |
| Density of Final Film, gms./cc. | 1.3777 | | | |
| Initial Film Thickness, mils | 8.7 | 8.7 | 8.7 | 8.7 |
| Thickness Reduction Ratio (MD)* | 0.598 | 0.471 | 0.552 | 0.564 |
| Thickness Reduction Ratio (TD)** | 0.572 | 0.370 | 0.539 | 0.552 |
| Tenacity (tensile strength) p.s.i.: | | | | |
| (MD) | 18,000 | 14,500 | 15,500 | 17,000 |
| (TD) | 14,000 | 10,000 | 13,000 | 13,000 |
| Elongation (percent): | | | | |
| (MD) | 56 | 90 | 75 | 47 |
| (TD) | 36 | 173 | 50 | 36 |
| Initial Tensile Modulus (p.s.i.): | | | | |
| (MD) | 500,000 | 450,000 | 600,000 | 580,000 |
| (TD) | 450,000 | 276,000 | 395,000 | 530,000 |
| Thermal Shrinkage (percent): | | | | |
| (MD) | 2.4 | 2.0 | >4 | >5 |
| (TD) | 2.1 | 1.9 | >4 | >5 |

*First direction of rolling.
**Second direction of rolling.

Tensile modulus is a measure of the film stiffness (i.e., the higher the modulus the greater the stiffness). Modulus is taken from the slope of the initial or Hookian portion of the stress/strain curve at 1% elongation, the film being elongated at a rate of 100% per minute.

thickness reduction ratio after first direction of rolling and second direction of rolling, and resulting physical properties of the rolled film.

In the following example, crystalline (crystallized at 130° C. for 5 minutes under a pressure of about 1200 p.s.i. and cooled to 80° C. before releasing pressure) polyethylene terephthalate film having a density of about 1.3705 grams/cc. was rolled (film was at room temperature prior to rolling) in one direction by passing the film through the nip of two stainless steel rolls 4¾" in diameter and about 8" in length and rotating at a speed of about 2 r.p.m.

Table III summarizes pertinent information such as original film thickness, thickness of film after rolling, density of film after rolling, temperature of rolls, and

TABLE I

| Example | Original Thickness (mils) | Final Thickness (mils) | Roll Temperature, ° C. | Thickness Reduction Ratio | | Tenacity, p.s.i. | | Elongation, Percent | | Modulus, p.s.i. | | Thermal Shrinkage, Percent | |
|---|---|---|---|---|---|---|---|---|---|---|---|---|---|
| | | | | First Dir. Rolling | Second Dir. Rolling | MD | TD | MD | TD | MD | TD | MD | TD |
| Control A | 50.0 | | | | | 8,000 | 8,000 | 450 | 450 | 300,000 | 300,000 | Became embrittled during test | |
| Control B | 18.6 | 2.6 | 115 | 0.650 | 0.600 | 22,900 | 16,600 | 118 | 92 | 494,000 | 420,000 | >5 | >5 |
| 1 | 45.0 | 5.7 | 150 | 0.633 | 0.654 | 22,100 | 23,400 | 141 | 101 | 443,000 | 527,000 | 2.8 | 2.3 |
| 2 | 66.0 | 8.4 | 150 | 0.666 | 0.610 | 18,200 | 17,900 | 104 | 91 | 476,000 | 439,000 | 2.9 | 2.4 |
| 3 | 45.0 | 6.2 | 190 | 0.666 | 0.587 | 23,100 | 17,200 | 99 | 64 | 520,000 | 426,000 | 1.5 | 1.2 |

Control A—Amorphous, unoriented polyethylene terephthalate film.
Control B—Roll temperature below the critical range.

thickness reduction ratio, as well as significant properties of the rolled film.

TABLE III

*Properties of one-way rolled crystalline polyethylene terephthalate film and conditions of rolling*

| Rolling conditions and film properties: | Example 6 |
|---|---|
| Temperature of rolls | 160° C. |
| Density of final film _____gms./cc. | 1.3787 |
| Intial film thickness _____mils | 8.7 |
| Final film thickness _____do | 3.48 |
| Thickness reduction ratio (MD) | 0.60 |
| Tenacity (tensile strength) p.s.i.— | |
| (MD) | 25,600 |
| (TD) | 7,200 |
| Elongation percent— | |
| (MD) | 68 |
| (TD) | 32 |
| Initial tensile modulus— | |
| (MD) | 820,000 |
| (TD) | 340,000 |
| Thermal stability percent— | |
| (MD) | 0.6 |
| (TD) | 0 |

A particular advantage of the present process is that it is capable of producing an oriented polyethylene terephthalate film which is substantially stable at temperatures at least as high as the temperature at which the film was rolled. For example, a film rolled in two directions at a temperature within the range of from 150°–190° C. is considered to be capable of passing the "Thermal Stability Test,"[1] Furthermore, by rolling to ---
[1] A film will pass the "Thermal Stability Test" if it shrinks less than 3% in the first direction of rolling and less than 2.5% in the second direction of rolling after exposure of 150° C. for 30 minutes.

--- the extent that the thickness reduction ratio is reduced equally in rolling the film in both directions, a film having substantially balanced tensile properties is obtainable.

Furthermore, the oriented, crystalline polyethylene terepthalate films produced by the present process are highly crystalline yet highly transparent. In most cases, the initial (before rolling) crystalline films, depending upon the degree of crystallinity, will vary in appearance from slightly hazy to opaque, but the present process converts this initial film to one having a high degree of clarity.

Still another advantage of the present invention is that the orientation efficiency of two-way rolling of a crystalline polyethylene terephthalate film is greater than that of conventional two-way stretching processes. That is, to obtain equivalent physical properties by starting with the same film, it is necessary to reduce the film thickness and thereby increase the length and width of the film to a greater degree when orientation is effected by stretching than when orienting a film by rolling in two directions. As a consequence, it is not only easier to orient thicker polyethylene terephthalate films in the present process, but the degree to which the thickness must be reduced to obtain the desired level of physical properties is less with the present process than in the case of the two-way stretching process. In this way, it is possible to prepare thicker films having unit physical properties equivalent to those of thinner films formed by two-way stretching. The thicker films produced by the present process are useful in a variety of glazing applications.

The present process is highly advantageous for orienting thick slabs of polyethylene terephthalate which are difficult, if not impossible (depending on actual thickness), to cast from a melt in wholly amorphous form. In general, relatively thick slabs which have been cast from molten polymer contain a considerable amount of crystallinity, and the present process is highly useful in orienting such slabs of polymer.

I claim:

1. The process for simultaneously heat-setting and orienting polyethylene terephthalate film which comprises rolling out unoriented, crystalline polyethylene terephthalate film, having a density of at least 1.36, with heated pressure rolls maintained at a temperature within the range of from 150°–190° C.

2. A process according to claim 1 wherein the film is rolled out to a thickness reduction ratio of at least 0.50.

3. The process for simultaneously heat-setting and orienting polyethylene terephthalate film which comprises rolling out unoriented, crystalline polyethylene terephthalate film having a density of at least 1.36, in one direction with heated pressure rolls maintained at a temperature within the range of from 150°–190° C. until the thickness of the film is reduced to the desired extent, and thereafter rolling out the film in the transverse direction with heated pressure rolls maintained at a temperature within said range until the thickness of the film is further reduced to the desired extent.

4. A process according to claim 3 wherein the film is rolled out in each direction to a thickness reduction ratio of at least 0.50.

5. A process according to claim 4 wherein the thickness reduction ratio is substantially the same in both directions.

References Cited in the file of this patent

UNITED STATES PATENTS

| 2,176,091 | McClurg et al. | Oct. 17, 1939 |
| 2,244,208 | Miles | June 3, 1941 |
| 2,497,376 | Swallow | Feb. 14, 1950 |
| 2,556,295 | Pace | June 21, 1951 |
| 2,578,899 | Pace | Dec. 18, 1951 |